Figure 1:
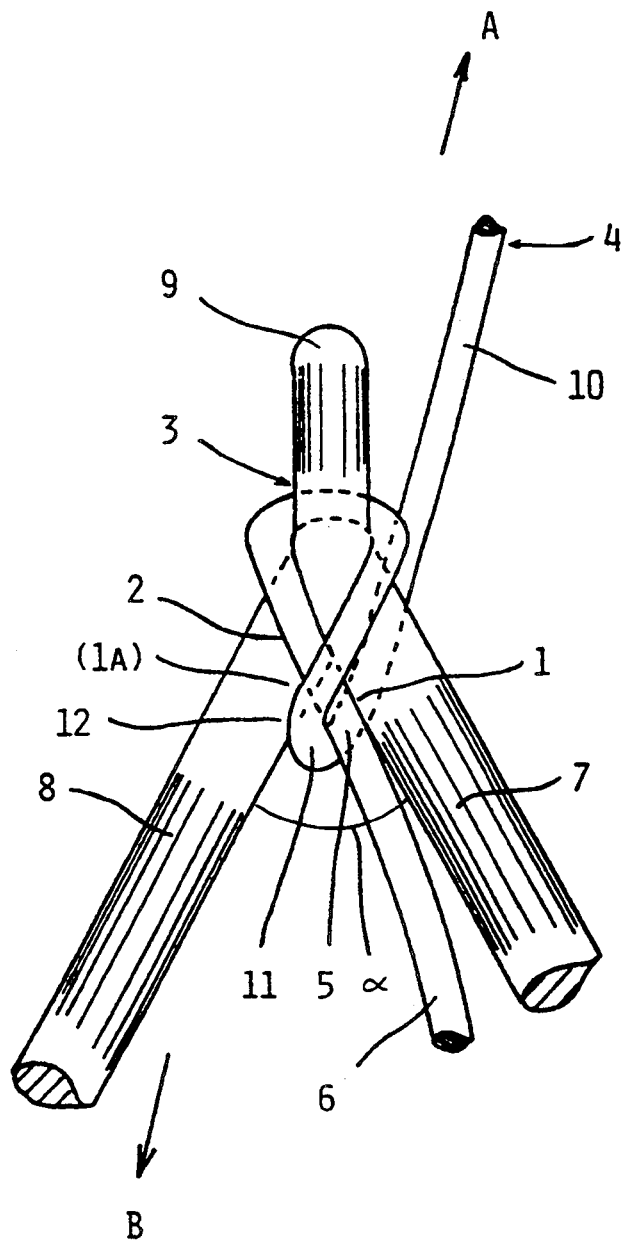

United States Patent [19]
Serlachius

[11] Patent Number: 5,339,497
[45] Date of Patent: Aug. 23, 1994

[54] FASTENING DEVICE

[76] Inventor: Jarl F. Serlachius, Kavallvägen 1 E, Grankulla, Finland, SF-02700

[21] Appl. No.: 30,027
[22] PCT Filed: Jul. 12, 1991
[86] PCT No.: PCT/FI91/00217
  § 371 Date: Mar. 10, 1993
  § 102(e) Date: Mar. 10, 1993
[87] PCT Pub. No.: WO92/00684
  PCT Pub. Date: Jan. 23, 1992

[30] Foreign Application Priority Data

Jul. 13, 1990 [FI] Finland .................. 903568

[51] Int. Cl.$^5$ .................. A44B 21/00
[52] U.S. Cl. .................. 24/129 R; 24/130
[58] Field of Search .................. 24/129 R, 130, 131 R, 24/115 M, 115 H, 16 R, 17 B, 18, 19; 410/105, 106, 107, 108, 109, 110, 111, 112, 113

[56] References Cited

U.S. PATENT DOCUMENTS

| | | | |
|---|---|---|---|
| 363,495 | 5/1887 | Wilson, Jr. | 24/130 |
| 406,407 | 7/1889 | Smith | 24/131 R |
| 468,819 | 2/1892 | McAnarney | 24/129 R |
| 1,205,496 | 11/1916 | Whitehead | 24/129 R |
| 1,565,041 | 12/1925 | Arney | 24/129 R |
| 2,414,945 | 1/1947 | Grund | 24/129 R |
| 2,441,336 | 5/1948 | Sova | 24/129 R |
| 2,465,473 | 3/1949 | Patterson . | |
| 2,597,210 | 5/1952 | Walters . | |
| 2,679,082 | 5/1954 | Himberger . | |
| 3,279,010 | 10/1966 | Misanchuk . | |
| 3,353,228 | 11/1967 | Kish et al. . | |
| 3,930,288 | 1/1976 | Black et al. . | |
| 3,953,911 | 5/1976 | Fishack . | |

FOREIGN PATENT DOCUMENTS

| | | |
|---|---|---|
| 383959 | 10/1987 | Austria . |
| 0345175 | 6/1989 | European Pat. Off. . |
| 507125 | 6/1920 | France . |
| 2189709 | 4/1987 | United Kingdom . |

Primary Examiner—Victor N. Sakran
Attorney, Agent, or Firm—Merchant, Gould, Smith, Edell, Welter & Schmidt

[57] ABSTRACT

The invention relates to a device for power exerting connection to a flexible elongated pulling means (4). The invention also relates to a specific use of the device in connection with flexible pieces. The device comprises at least three elements extending into different directions, each element having a respective contact surface (1, 2, 3), at which said elongated pulling means (4) is laid, so that a first loop (5) of said pulling means (4) runs from one essentially unloaded end (6) along a first contact surface (1) at a first leg (7). Thereafter said pulling means (4) runs over a second contact surface (2) at a second leg (8) and behind an essentially tenon-like protrusion (9) having a third contact surface (3). Said first leg (7) converges at least slightly against an opposite guiding or straining surface (12) at said second leg (8). Due to the arrangement said pulling means (4) is centered to be locked at said contact surface (1) at said first leg (7).

12 Claims, 8 Drawing Sheets

FASTENING DEVICE

The invention relates to a device for power exerting connection to a flexible elongated pulling means. The device is especially intended for fixing an attachment along the extension of a rope or a cord or the like in such a manner, that the end portions of the rope or the cord need not be threaded through any part of the device. The invention also relates to a specific use of the device.

Several methods and devices are known for fixing ropes, cords or the like to different objects, in order to make, in this manner, possible the exertion of power with or upon the rope. Usually the methods comprise the forming of a more or less strong and more or less complicated knot, so that different loops of said rope will lock underlying loops, thus preventing slipping.

Usually the tying of strong knots comprises threading one free end of said rope or cord through loops or the like formations, or around fixed obstacles. Difficulties, however, arise if one wishes to fix an attachment along a rope the ends of which are not for some reason free. Traditionally in such cases one has used a loop of the rope, which loop then has been tied into a suitable knot. Such knots are, however, never as strong as a corresponding knot on a single rope, and therefore there is always a risk for slipping, which in some cases may be fatal.

Another drawback with conventional knots is the fact, that only a few special knots are suitable for accommodating strong forces in such a way that the knot may still be easily opened after the rope or cord has once been stretched to its limits.

Various arrangements have been developed in order to solve the above problem, in which arrangements a device is mechanically tightened to a rope or cord. In most such arrangements the problem remains that the rope or cord itself is intended to pass through holes or apertures in the device, which thus cannot be used in cases where both ends of the rope are fixed or for some other reason difficult to thread, due for example to the rope length or the end structure of the rope. Further, special pulling devices have been developed for fixing a steel wire or some other essentially non-bending pulling means. Such devices are, however, technically complicated and charge the pulling means with teeth or the like means. U.S. Pat. No. 3,930,288 on the other hand discloses a complicated device for the branching of ropes.

Further, conventional cleats are known, at which a rope is locked by winding it several times in loops located one upon the other, moving it to and from around a fixed pin or the like until the rope successively locks itself so that a reliable attachment is achieved. The drawback with such a cleat is that for a satisfactory function it needs a considerable amount of rope. A conventional cleat device is further so designed that it cannot be used in any suitable manner standing free from a fixed structure.

The object of the present invention is to provide a fastening device which can be fastened by simple manipulation at a nearly arbitrary position along a rope or a cord. The device is further such, that it works independently of whether it is totally loose and free standing or is connected to a fixed structure. The attachment of the pulling means, for example the rope or the cord, is such that said attachment without slipping will withstand a stress equal to the stress in the rope itself but may and still thereafter be loosened by a simple manipulation.

The characteristic features of the invention are indicated in the attached claims. Thus the invention is characterized by the device having at least three elements extending in different directions, said elements having contact surfaces at which an elongated pulling means is to be wound. The winding proper is made so that a first loop of said pulling means runs from one first essentially unstressed end thereof along a first contact surface at a first leg of the device. Thereafter said pulling means runs over a second contact surface at a second leg and behind an essentially pin like protrusion having a third contact surface, in order to center the position of a locked loop of said pulling means and a locking loop positioned over said locked loop against said first contact surface. Said first leg converges slightly towards an opposite guiding- or straining surface at said second leg, so that said pulling means with its extension at an essentially pulled end located opposite to said first end finally forms a straining loop, said loop being suitably wedged against said guiding- or straining surface and extending over said first loop of said pulling means, thus locking said first loop to said first contact surface. An especially preferable use of the device includes an arrangement wherein said fastening devices are arranged at both ends of a flexible piece. Another preferred embodiment comprises the use of the inventive device in connection with articles of clothing or the like.

Figure 2:
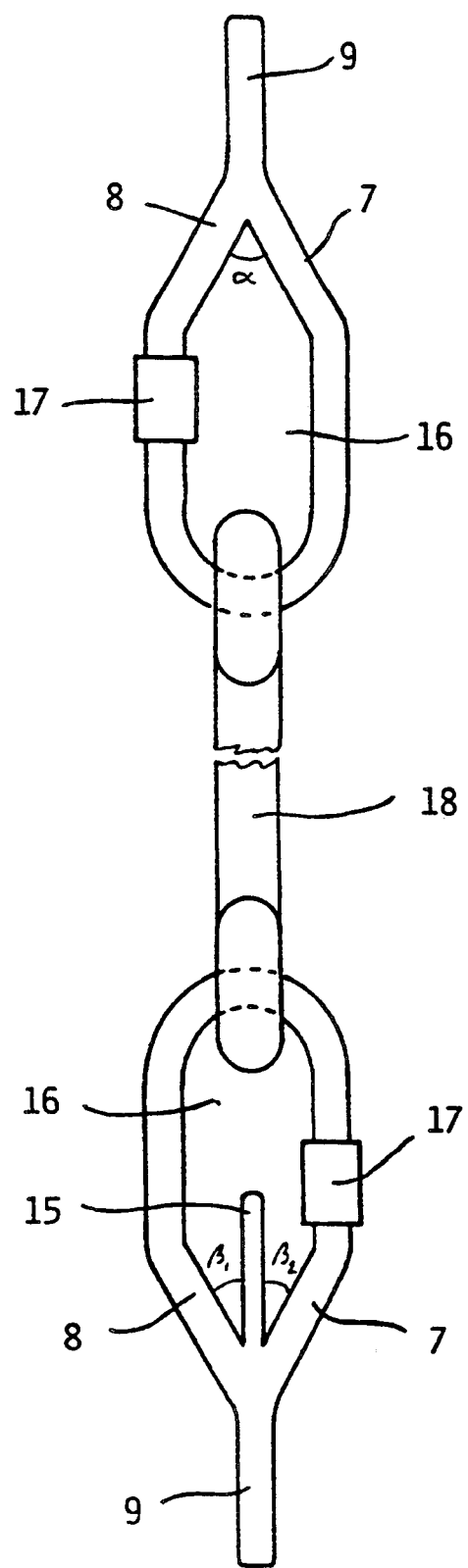
Figure 3:
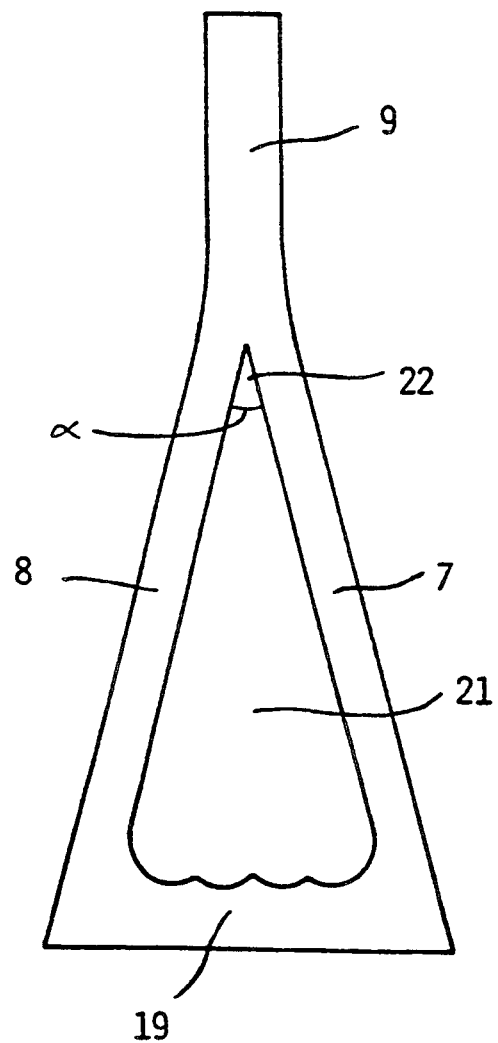
Figure 4:
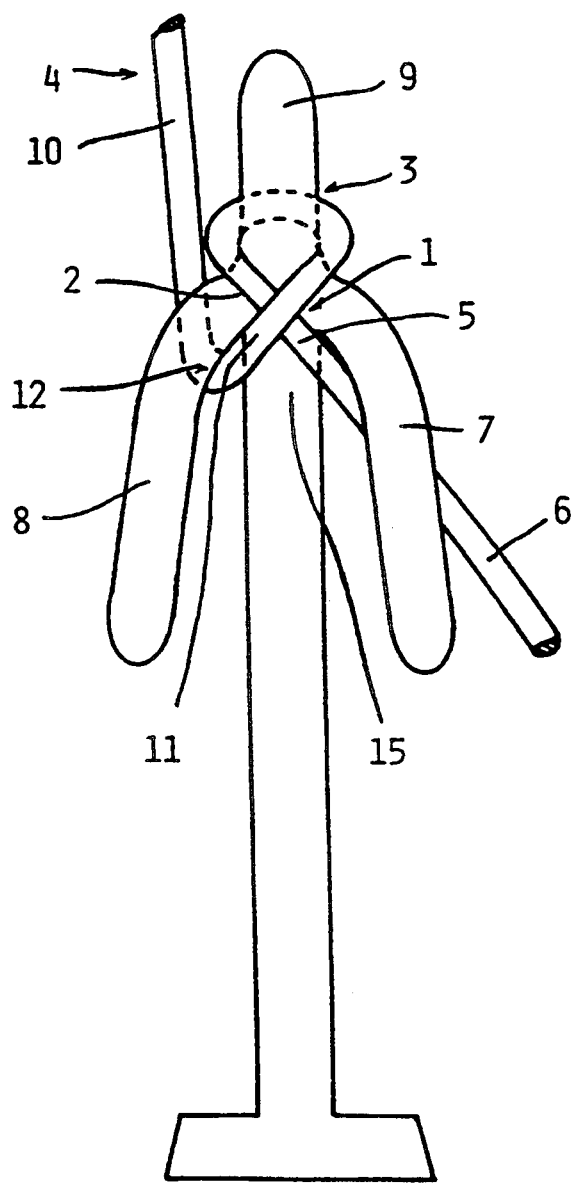
Figure 5:
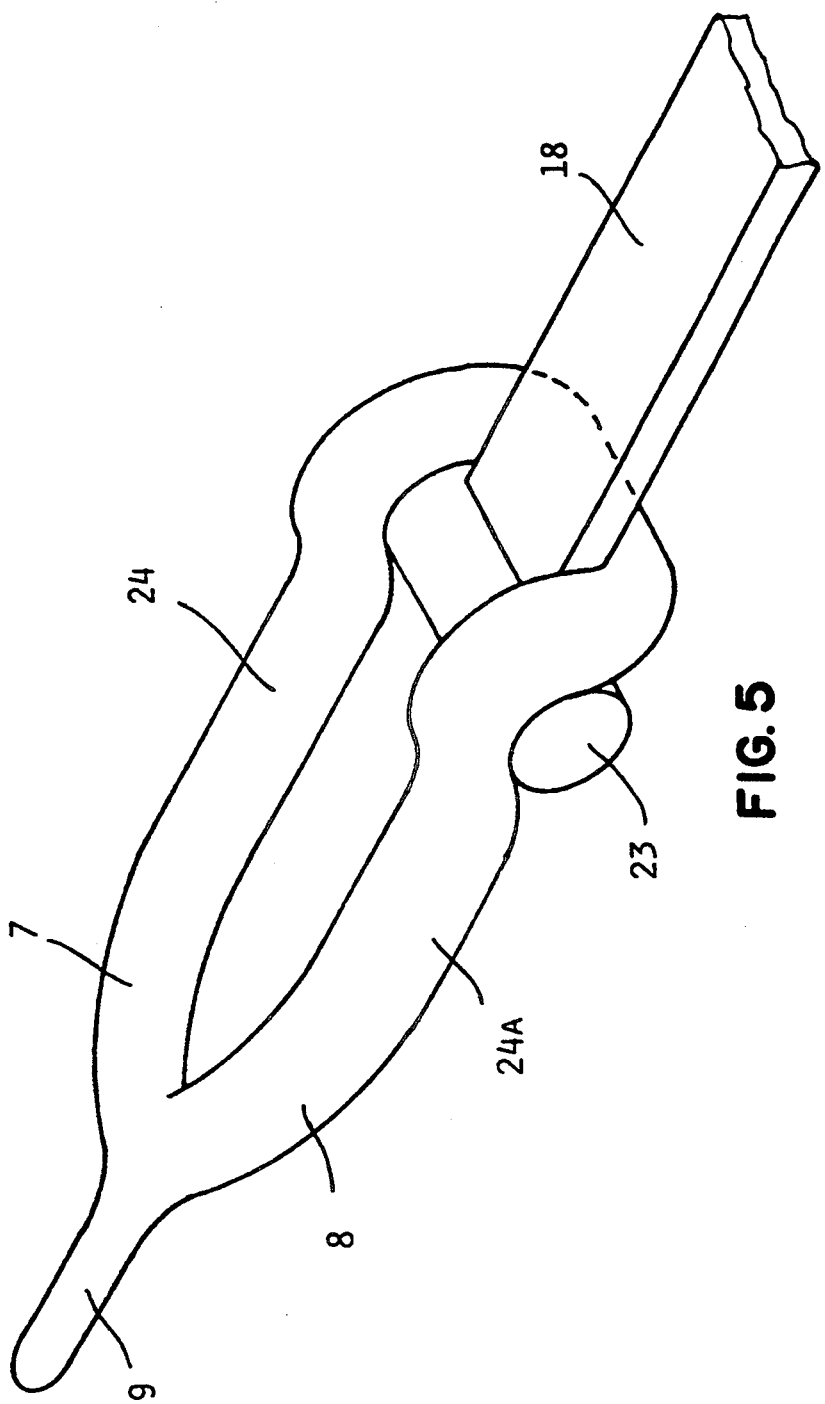
Figure 6:
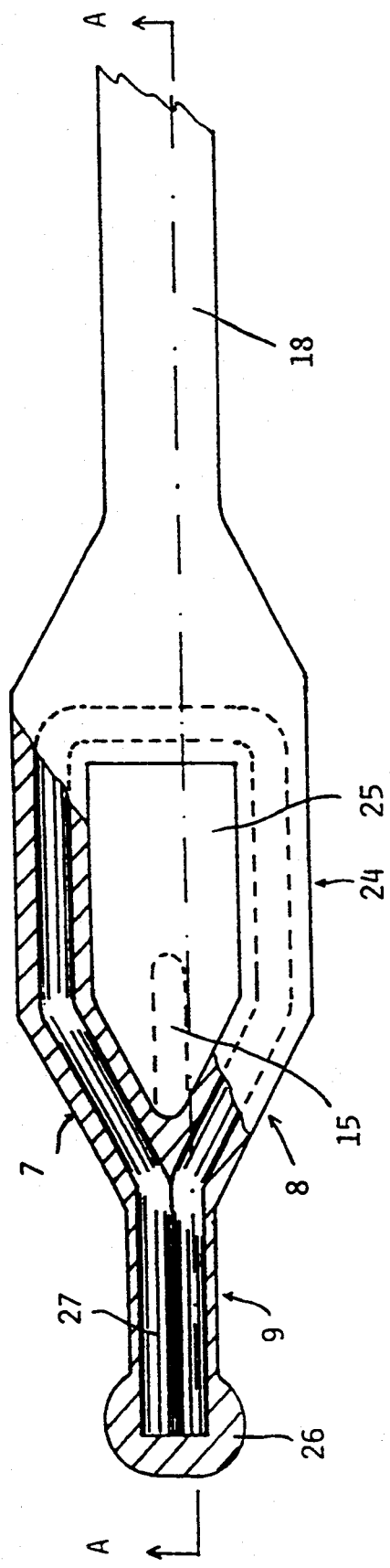
Figure 7:
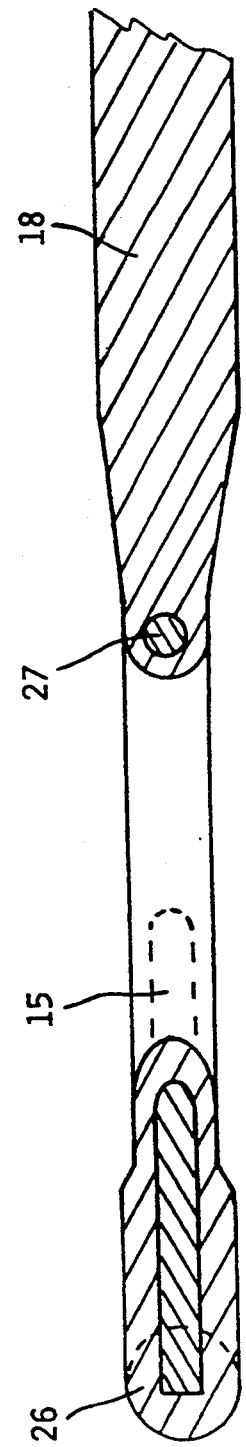
Figure 8:
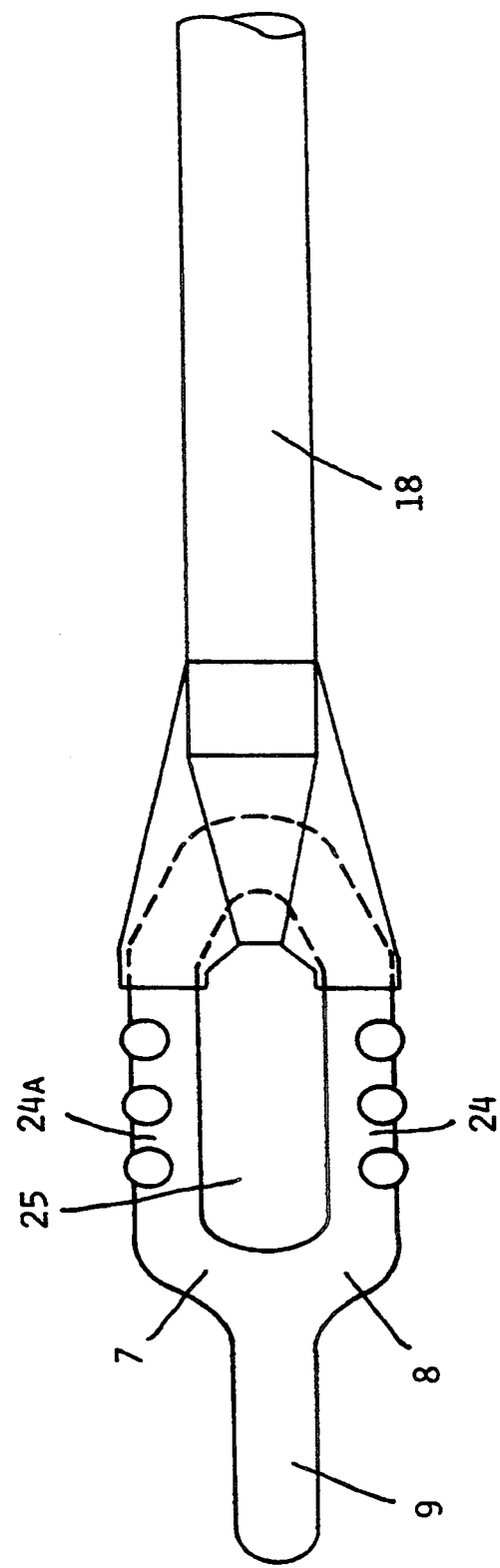
Figure 9A:
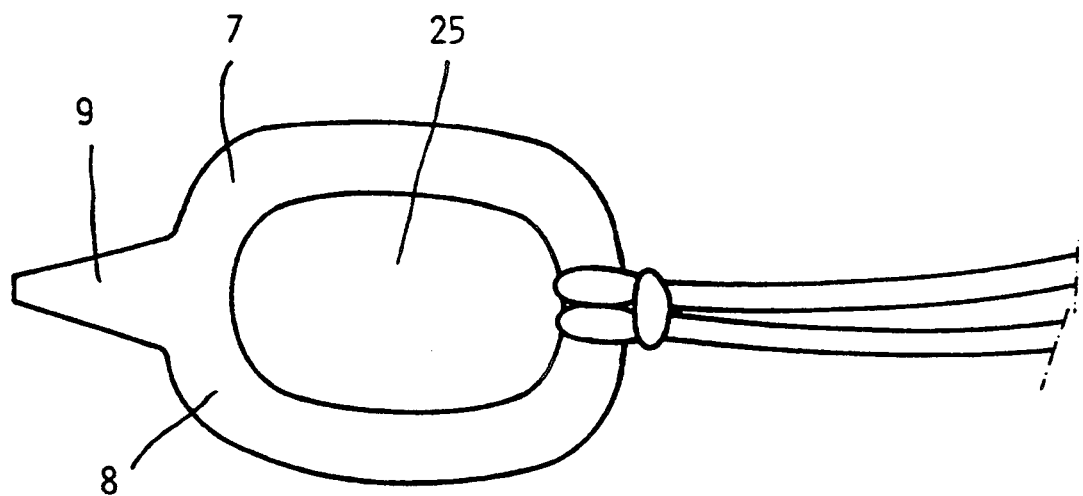
Figure 9B:
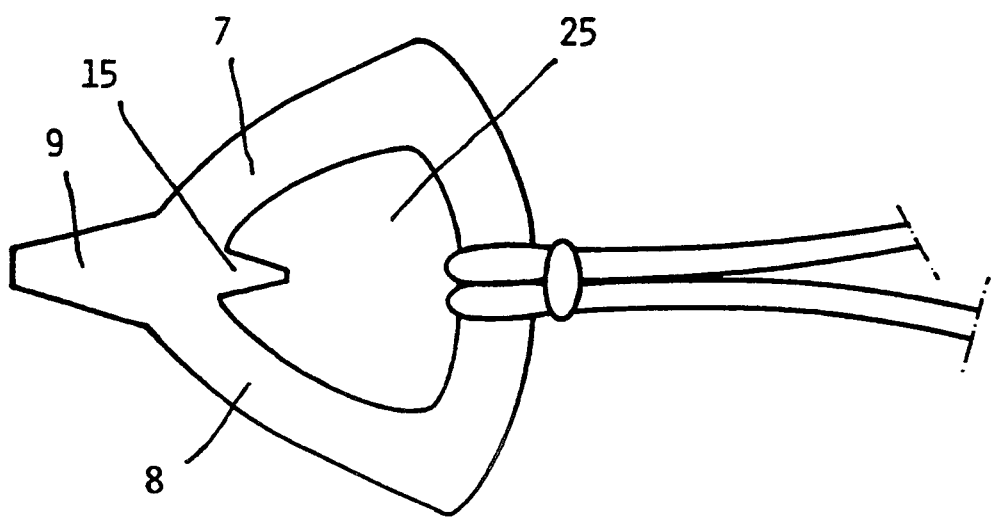

The invention will now be described with reference to the attached drawing, where FIG. 1 shows the general functional principle of the inventive device, FIG. 2 shows general applications in connection with a resilient mooring or pulling device, FIG. 3 shows an application as a handle to be attached to a rope, FIG. 4 shows a special embodiment of the inventive device, applied as a general fixing point for ropes and cords, FIG. 5 show a preferred embodiment of the invention in connection with a resilient flexible piece, FIG. 6 shows an especially preferred embodiment of the invention in connection with a resilient flexible piece, FIG. 7 shows a section (A—A) of the device in FIG. 6, FIG. 8 shows an alternative embodiment of the device according to FIG. 6, and FIGS. 9A and 9B show sketched alternative embodiments of the invention.

The device according to FIG. 1 shows the invention in its simplest form and comprises an essentially Y-shaped piece having legs 7, 8 extending both in the same general direction and positioned at an angle with respect to each other, said device further comprising a tenon-like protrusion 9 extending generally in the opposite direction. Legs 7 and 8, respectively, comprise surfaces 1, 1a, one of which acts as a contact surface, depending on at which side said pulling means, for example a rope 4, is laid. The corresponding surface 1a at said second leg 8 acts as a guiding surface or suitably as a straining surface 12, and, respectively, as said contact surface when said rope 4 runs as a mirror-image of the case indicated. Said first contact surface 1 at said first leg 7 will thus be located inclining transversely opposite in relation to the general pulling direction A for said pulling means 4, said first contact surface 1 being set at an angle α against said second leg 8.

The locked portion 5 of rope 4 abuts said contact surface 1 under a loop 11, which, when said rope is guided correctly, comprises a direct extension of that rope end 10, where the actual power exertion takes place during a haul. A haul in the rope end 10 will make said loop 11 strain harder against the end 6 and its loop 5, which under said loop 11 will be harder strained against said contact surface 1 thus being locked. Since said leg 7 converges against said straining surface 12 of said second leg 8 said loop 11 simultaneously will be wedged in between said loop 5 and said straining surface 12, so that said loop 11 will not open up even if said rope 4 possibly were to slack off.

In order to improve the locking said contact surfaces 1, 1a, 2 and 3, respectively, as well as said corresponding straining surface 12 may comprise suitably inclined knurled formations or a corresponding coarse surface structure for increasing the friction.

For the device to have the fastening effect desired it is essential, that the rope 4 at a pull presses said loop 5 strongly against said contact surface 1. In the embodiment shown in FIG. 1 this is achieved thereby, that the rope 4 runs from said end 10 in a loop 11 over said end 6 and its loop 5 and over said first leg 7 and back in essentially the same direction, so that said loop 11 will have a generally U-shaped run. For this purpose said rope is placed around a tenon-like guiding protrusion 9, which is essential for the invention, behind which protrusion said rope rests against a contact surface 3 after which it runs back over said leg 8 having an upper contact surface 2, in order to finally form said locked loop 5 of said free end 6. For the invention it is, in this case, unessential how said free end 6 continues, and said end may e.g. be completely loose or fastened to another structure, or, as is indicated more clearly in FIG. 2, to a corresponding device directed into the opposite direction.

According to the invention the rope proper may be wound around the device in essentially two different manners. A secure manner, which may be utilized independently of said legs 7, 8 being, at their opposite ends, open or possibly closed into a shape shown e.g. in FIGS. 2, 3, 5 . . . 9, comprises the steps of bringing a loop of the rope 4 in between said legs 7 8, turning said loop half a turn, and threading said loop over said tenon-like protrusion 9. Said protrusion 9 centers then the position of said rope with respect to said legs 7 8, so that a locking may be achieved. Thereafter the rope 4 is stressed. Due to the structure of the device, said tenon-like protrusion 9 having a circumference smaller than the circumference formed around both legs 7, 8 and the angle between them, the rope 4 and especially its loops 5 and 11 will slide a bit, when exposed to stress, and thereafter they will automatically, due to the guiding influence of said protrusion 9, take a position where said loop 5 at the non-pulled end 6 will be locked between said contact surface 1 and said leg 7 and said pulled loop 11, which itself then will be locked between said loop 5 and said straining surface 12.

For said reasons it is preferred that said tenon-like protrusion 9 extends from a point located outside the area which is defined by the (geometrical) projection of said open angle α between said legs 7, 8, and favorably so, that the circumference of said protrusion 9 at its base is smaller than all circumferences formed around both legs and said angle α in the area of said angle.

An alternative way to achieve the desired twist in the rope is holding the more free end 6 essentially along one leg 7, and thereafter twisting said rope over said contact surface at the other leg 8, up over contact surface 3 behind said tenon-like protrusion 9 and back over said more free end 6 and its loop 5. Laying the rope this way automatically brings about said U-shaped loop 11 locking said loop 5 of said rope end 6 at said contact surface 1, when a pulling force is exerted at said pulled end 10 in the general pulling direction indicated A. This way of twisting automatically brings said loops 5 and 11 into correct positions at the bottom of said angle α between said legs 7 and 8.

The exact position for loops 5 and 11 may not be absolutely critical for the function, but it is still appropriate to locate the loops as deep into the bottom of said angle α as the rope thickness permits. Thus a certain locking of said U-shaped loop 11 is achieved by said loop abutting said contact surface 2 of said second leg 8, before it becomes wedged in between said stressing surface 12 and said loop 5 for locking said loop 5. In order to secure the locking also in cases when no pulling power acts upon the rope 4 it is appropriate, that the acute angle α between said legs, and especially between their opposite contact surfaces, is of the order 30° . . . 14° . For many rope types angle of the order 45° . . . 70° has proved to be especially effective, while other rope types and applications well permit an angle up to 120° without any reduction in the firmness. This applies especially for the area where said loops 5, 11 of said pulling means will be located after said twisting, i.e. where the distance between said legs 7, 8 is less or equal to twice the diameter of said pulling means 4.

For certain embodiments said angle α between said legs may even be essentially constituted by said legs extending from a generally rounded base surface, where said leg angle is nearly 180°, whereafter said legs gradually turn towards each other. This embodiment is especially suitable for certain rope types and in cases, where easy unlocking is more important than the durability of the locking during repeated slackenings of the pulled end 10 of said rope. Examples of such embodiments appear in FIGS. 8 and 9A. At said embodiments an essentially acute angle is normally formed for stout ropes 4 between on one hand a respective leg 7, 8 and on the other that rope loop 5, which already butts against the respective other leg 8, 7. A stout rope will thus be pressed in between one leg on one hand and that rope portion which lies close to the other leg, on the other hand, so that a locking is achieved. If the rope is so slender, that a locking in the described manner cannot be achieved, said protrusion 9 will in any case center said free end 6 and said loop 11 in such a mutual manner, that said loop 5 at said free end 6 will always be located under said pulled loop 11 and thus it will be pressed against said contact surface 1 at one of said respective legs 7, 8. Said contact surface 1 will normally be located somewhat higher up along the periphery of the leg (when seen from the bottom portion of said angle α, and sometimes the contact surface in these embodiments will be located near the plane, which is formed by the outermost surfaces of said legs 7, 8 and said tenon-like protrusion 9. In this way a locking will be achieved, which usually is sufficient, especially in applications where the pulling is continuous, or where an unlocking does not result in any considerable disadvantage.

For certain types of especially slippery ropes it is appropriate to arrange, at one or more contact surfaces, special means for guiding the position of said rope in relation to the respective contact surface. Such means may comprise notches for the rope or beads or the like projections for guiding said rope. FIG. 4 shows such a very favourable alternative embodiment of the invention, the device comprising an auxiliary tenon, i.e. a second tenon-like protrusion 15, which actively guides the loop 11 at the pulled end 10 of said rope 4, in relation to the essentially unloaded end 6. In this embodiment said tenon-like protrusion 15 divides said angle $\alpha$ into two parts, so that said essentially unloaded end 6 of said rope 4 is forced to run on one side of said protrusion 15, while said loaded end 10 runs on the other side of the protrusion 15 between the protrusion and said second leg 8. In this case loops 5 and 11, respectively, at said ends will cross each other at the base of said second protrusion 15, and said contact surface 1 will consequently be located upon the device at the common base portion of said leg 7 and said protrusion 15. This embodiment is especially advantageous in cases where the load on said rope end 10 may vary considerably in force and direction, since said second tenon-like protrusion 15 will define a locking contact surface 1 exactly while at the same time achieving an effectively wedged locking of said loop 11 between said protrusion 15 and said strain surface 12 at said second leg 8. In this embodiment both partial angles $\beta_1, \beta_2$, i.e. the angle between said second protrusion 15 and the respective leg 7, 8, are suitably of an equal order of magnitude (30°...75°) as said earlier mentioned angle $\alpha$ between said legs 7, 8. Usually it is appropriate that both partial angles $\beta_1$ and $\beta_2$ are essentially equal, so that the twisting direction for said pulling means 4 need not be chosen in advance. In certain special cases said partial angles may be of different magnitude, which for certain special types of rope gives a better hold, at the expense of the device's "two-sided" function.

As indicated above the tenon-like protrusion 9 is of essential importance for the device's function. Said tenon-like protrusion 9 extends suitably from a point located outside an area defined by the open angle between said legs 7, 8. The length of said protrusion, determined from said point, should be at least 2 times the diameter of said pulling means 4, in order to prevent said loop behind said protrusion 9 and its contact surface 3 from moving up over said protrusion 9 at any momentary slackening of said pulling means 4. Such a movement would immediately decompose the whole arrangement, and therefore it is appropriate, that said tenon-like protrusion 9 has a diameter of 3...6 times, in some special loosely laid application even 10 times the diameter of said pulling means 4. In a special embodiment of the invention said decomposition of the arrangement is utilized so that said tenon-like protrusion 9 is arranged to be bending or retractable behind a lock which prevents unvoluntary opening.

In order to achieve a self-tightening function the circumference of said tenon-like protrusion 9 at its base is suitably less than all those circumferences found around both legs and said angle $\alpha$ in the area of said angle $\alpha$. In this way said pulling means 4 will always, when stressed, slide automatically into position until said pulling means 4 is located around the base of said tenon-like protrusion 9 resting against its contact surface 3.

The general working principles of the invention have been explained above. The special embodiments of the invention comprise several applications, where in said first leg 7 comprises a shorter portion, whereby the real power exertion will take place via said second leg 8. In certain other applications said first and second legs 7, 8 are connected to each other also outside said area comprising said contact surfaces 1, 2, 3, i.e. outside the area where said pulling device 4 will be locked to the device. Thus FIG. 2 shows an application especially designed for marine conditions. In this application, showing an examples of two different embodiments of the invention, said legs 7, 8 constitute a closed ring 16, which in the shown embodiment further may be opened through a locking nut 17 in accordance with known shackles. In contrast to known shackles both devices according to FIG. 2 may easily be fastened to an arbitrary point along a rope without requiring access to any free rope end.

In the embodiment shown in FIG. 2 there are two such devices, one of which by way of an example further comprises a second tenon-like protrusion 15, according to the invention connected each to its own end of an elastic band 18 or the like. Thus an elastic mooring device is achieved, which device may be fixed to any point along a mooring rope for e.g. small vessels, although said rope is already applied and fastened. The same arrangement may advantageously be used in the towing of vehicles, whereby an especially smooth and jerk free movement is achieved even if the drivers should happen to be unexperienced. Another embodiment comprises several devices connected to each other, said arrangement being applicable for branching ropes to different directions e.g. for fixing a load to a platform.

A further embodiment of the invention comprises a handle as shown in FIG. 3. Such a handle comprises two legs 7, 8 interconnected by a suitably transverse pulling bar 19 and it can be used for a variation of purposes when one wishes to obtain a firm grip on a rope or a cord. Such a handle has further the advantage, that the device can be easily moved along a rope not yet under strain, while a strain locks said handle to said rope in a secure manner.

Said pulling bar 19 between said legs 7, 8 may also be constituted by a more or less rigid structure, e.g. the frame of a vehicle, and the device according to the invention is especially well suitable for occasional towing of vehicles. By using the invention in both the towing and the towed vehicle a secure fastening of the tow rope is obtained, in a way that absolutely holds during the actual operation and which thereafter may be easily disconnected after the towing despite a heavy load. In an advantageous embodiment of the invention the device comprises one or more suitably pointed recesses 21 (see e.g. FIG. 3) arranged for example in a customary trailer hitch for light trailers. A usual haul stud with an affixed ball may thus temporarily work as said tenon-like protrusion 9. For the function of the invention it is not absolutely necessary that said protrusion extends in the same level as said legs 7 and 8, even though such an arrangement usually is preferable for simple handling.

In order to further secure the locking it may in some embodiments be appropriate that one or both legs 7, 8 further comprises special locking means preventing said rope 4 and its locking loop 11 from moving freely. Said locking means favorably comprise means movable along a respective leg 7, 8, suitably rings or tubes of plastic or the like elastic frictional material, which means are pressed against said loops 5, 11, when one wishes to safeguard oneself against the risk, that a slackening of the strained rope end 10 will lead to the twisted portion unfixing itself. Alternatively said locking means may comprise one or several pieces of elastic frictional material applied wholly or partially over said open angle α between said legs 7, 8. Such pieces then comprise one or several slots into which said rope 4 and its loops 5, 11 may be introduced under frictional impact each from its side, finally to form the desired twist. A U-shaped rope loop 11 locked in this manner cannot get out of position even if said rope end 10 were to slacken completely, and when said rope again comes under strain it will automatically assume a position where a strain over said loop 5 is present.

Especially advantageous embodiments are shown in FIGS. 5, 6 and 7. All of these concern devices, wherein the invention is used in connection with an elastic band or the like flexible piece, in order to allow a resilient mooring of boats, towing of vehicles and the like fields of application. Thus FIG. 5 shows in greater detail how a flexible band 18 suitably of a generally flat nature comprises a transverse beam-like portion 23. Said flexible band 18 and said beam-like portion 23 suitably comprise reinforcement bands or the like, which are mould into said flexible material in the joint between band and beam. The width of said flexible band 18 is equal to or preferably slightly exceeds the distance between essentially parallel extensions 24, 24a of said legs 7, 8. Said extensions 24, 24a run in a parallel curve over said transverse beam 23 of said flexible band 18, and thereafter they are joined under said band 18. The arrangement shown in FIG. 5 gives a firm and tearproof fastening for said flexible band 18 at the connecting device, and at the same time said band 18 may easily be replaced by twisting said band around its longitudinal axle, so that said transverse beam 23 is disengaged from the curved portion of said extensions 24, 24a.

The device according to FIGS. 6 and 7 show a further application of the invention in connection with a resilient flexible piece. Here the flexible piece 18 itself in each of its ends (for clarity only one end portion of said piece is shown) is designed so, that an opening 25 is constituted in the respective end, said opening being surrounded by extensions 24 and ending up with legs 7 and 8, from which said tenon-like protrusion 9 emanates. In said Figures a phantom line indicates, that the embodiment also may comprise a central protrusion 15, which is directed into said opening 25. Said tenon-like protrusion 9 comprises at its end suitably a thicker portion 26 preventing said elongated pulling means from freely sliding over said protrusion 9. The device itself is suitably made of a resilient flexible material, e.g. rubber or the like. In order to improve the resistance to tearing of the flexible material the device according to this embodiment suitably comprises, at its ends, reinforcement means 27 made e.g. of thread or bar like material of metal, plastics or of a flexible fiber material. These reinforcement means preferably run within the flexible basic material, at least around said opening 25 and inside said tenon-like protrusion 9.

FIG. 9A and 9B show different alternative sketches of an alternative embodiment of the invention, where the specific connecting device in accordance with the invention applies to a buckle to be used in clothing. The sketches show alternative buckles which as such may be used to button up e.g. a doffel coat, for lacing shoes, as a lock for knapsacks, bags or the like, or which works as a buckle for a girdle or the like. In the shown applications said buckle works in accordance with the inventive principles described above, while the buckle's artistic design of course may vary considerably according to the fashion and application demands. The shown embodiments should be regarded as examples only. Further it is evident for the average expert, that the invention within the scope defined in the claims may find applications in a great variety of fields wherein a ductile or flexible elongated element shall be connected to a buckle or the like element of essentially solid structure, said element being more or less fixedly mounted or alternatively attached to a corresponding flexible or resilient means.

I claim:

1. A mooring or towing device, comprising:
a resilient flexible intermediate piece;
connecting means, attached to both opposite ends of the resilient flexible intermediate piece, for connecting said device, at said both opposite ends, along the extent of a flexible elongated pulling means, each of said connecting means, at said ends respectively, comprising:
an opening;
an essentially Y-shaped portion having:
first and second legs with first and second leg extensions surroundingly constituting said opening;
a third leg of said Y-shaped portion being defined by a tenon-like guiding protrusion extending generally in an opposite direction with respect to said opening; and
said first and second legs and said protrusion having a first, second, and third contact surfaces, respectively, the contact surfaces being frictionally contact with said pulling means.

2. A device according to claim 1, wherein said first leg converges, in an angle, against an opposite straining surface at said second leg, said angle is chosen from 30° to 145°, the angle being disposed at least in an area where a distance between said first and second legs is at least twice a diameter of said pulling means, said protrusion guides said pulling means to form, at a first essentially unloaded end, a first loop running along said first contact surface at said first leg, and, at an essentially pulled second end, to form a straining second loop wedged against said straining surface of the second leg and extending over said first loop of said pulling means, thus locking said first loop at said first contact surface.

3. A device according to claim 1, wherein said first and second legs emanate from an essentially rounded common base surface, a conversion and a guiding effect are achieved due to a co-operation between said second leg and a surface of a first essentially unloaded end of said pulling means, said unloaded end laying against said first leg.

4. A device according to claim 3, wherein said tenon-like protrusion emanates from a point located outside an area defined by an open angle between said first and second legs, a length of said tenon-like protrusion, counted from said point, is at least two times a diameter of said pulling means.

5. A device according to claim 4, wherein a circumference of said tenon-like protrusion, at a base of said protrusion, is less than all circumferences formed around the first and second legs and said open angle within a region of said open angle.

6. A device according to claim 5, wherein said first contact surface at said first leg is slantingly transverse to a general pulling direction of said pulling means, said first contact surface forms said open angle against said second leg.

7. A device according to claim 6, further including means, arranged at the first, second, and third contact surfaces, for guiding a position of said elongated pulling means in relation to the respective first, second, and third contact surfaces.

8. A device according to claim 6, wherein a second tenon-like protrusion divides said open angle, said second protrusion emanating from an area of an apex of said open angle, said first contact surface is formed at a common base area of said first leg and said second tenon-like protrusion.

9. A device according to claim 1, wherein at least one contact surface of the first, second, third surfaces, and an opposite straining surface at said second leg comprises a surface structure, the surface structure being inclined knurled formations to improve friction between said elongated pulling means and the contact surface.

10. A device according to claim 1, wherein at least one of the first and second legs comprises locking means for preventing said pulling means with a locking loop from moving freely along the leg.

11. A device according to claim 10, wherein said locking means comprises a resilient member made of plastic.

12. A device according to claim 11, wherein said resilient member includes at least one aperture for locking said pulling means, said locking means at least partly covers an area of a converging angle between said first and second legs.

* * * * *